United States Patent [19]

Haidinger

[11]  4,092,227
[45]  May 30, 1978

[54] PROCESS FOR CATALYZING CHEMICAL REACTIONS

[75] Inventor: Walter Haidinger, Geneva, Switzerland

[73] Assignee: Battelle Development Corporation, Columbus, Ohio

[21] Appl. No.: 701,307

[22] Filed: Jun. 30, 1976

Related U.S. Application Data

[63] Continuation of Ser. No. 612,280, Sep. 11, 1975, abandoned, which is a continuation of Ser. No. 553,123, Feb. 26, 1975, abandoned, which is a continuation of Ser. No. 303,966, Nov. 6, 1972, abandoned.

[30] Foreign Application Priority Data

Nov. 11, 1971 Switzerland ............... 16476/71

[51] Int. Cl.² .............................................. B01K 1/00
[52] U.S. Cl. .................... 204/59 R; 204/1 T; 204/165; 204/195 S; 204/290 R
[58] Field of Search ............... 204/195 S, 1 S, 59 R, 204/164, 165

[56] References Cited

U.S. PATENT DOCUMENTS

| 3,216,911 | 11/1965 | Kronenberg | 204/1 S |
| 3,344,052 | 9/1967 | Yeb | 204/177 |
| 3,400,054 | 9/1968 | Ruka et al. | 204/1 S |
| 3,481,855 | 12/1969 | Kolodney et al. | 204/195 S |
| 3,503,809 | 3/1970 | Spacil | 429/33 |
| 3,514,377 | 5/1970 | Spacil et al. | 204/1 S |
| 3,654,112 | 4/1972 | Beekinans et al. | 204/195 S |
| 3,819,499 | 6/1974 | Hoogeveen et al. | 204/195 S |

Primary Examiner—F.C. Edmundson
Attorney, Agent, or Firm—Barry S. Bissell

[57] ABSTRACT

The invention relates to a process and device for catalyzing chemical reaction. The reaction system is brought into contact with the surface of a solid, electrically conducting layer provided with an underlying insulating or semi-conducting layer and an electric current is passed successively across both layers. The device comprises a stratified body having at least one electrically insulating or semi-conducting layer, covered at least partially with an electrically conducting layer suitable for contact with the reaction system, and means for applying a voltage for passage of a given electric current across said body.

Heterogeneous catalysis of a desired reaction is achieved at the surface of the conducting layer due to said current passage.

9 Claims, 6 Drawing Figures

PROCESS FOR CATALYZING CHEMICAL REACTIONS

This is a continuation of application Ser. No. 612,280, filed Sept. 11, 1975, which is a continuation of Ser. No. 553,123 filed Feb. 26, 1975, which is a continuation of Ser. No. 303,966 filed Nov. 6, 1972, all now abandoned.

FIELD OF THE INVENTION

The present invention relates to the field of heterogeneous catalysis.

BACKGROUND OF THE INVENTION

The terms activity and selectivity are generally used to characterize the effectiveness of a catalyst with respect to a given chemical reaction. The rate of the reaction is a function of the activity of the catalyst, which may be expressed as the amount of the reactants which are transformed per unit time and per unit surface area (or weight) of the catalyst. On the other hand, the selectivity of a catalyst expresses the amount of a given desired reaction product which is obtained per unit time, per unit mass of transformed reactants and per unit surface area (or weight) of the catalyst.

As is known, the catalysts which are currently used are in general highly specific in their application, but frequently do not fulfill the present high technical requirements of simultaneously achieving high selectivity as well as high activity.

Since the number and the variety of the chemical reactions which are of technical interest have been rapidly increasing, the field of heterogeneous catalysis now presents numerous highly complex problems related to selectivity and activation, whether thermal or otherwise. A considerable amount of research work has thus become necessary in order to obtain new and more effective catalysts for specific applications.

Relatively high reaction temperatures are generally necessary to ensure satisfactory reaction rates. In exothermal reactions, the equilibrium constant decreases as the reaction temperature increases so that the yield of the reaction decreases accordingly. Hence, it is necessary to achieve a suitable compromise in the choice of the temperature of each exothermal reaction, so that the reaction rate may be made sufficiently high without the equilibrium constant becoming too low to ensure a satisfactory yield of the desired product.

An increase of the reaction temperature is moreover undesirable in many cases where high temperatures may affect the stability of the reaction products, thus leading to decomposition thereof, or may produce undesirable secondary reactions.

A main object of the present invention is to achieve acceleration of various types of chemical reactions while largely obviating the above-mentioned drawbacks and limitations.

Another object of the invention is to allow various chemical reactions to be carried out so as to produce given desired reaction products with a satisfactory yield.

A further object of the invention is to provide means suitable for improving selectivity in the catalysis of different chemical reactions which may lie in a broad range of reaction types.

SUMMARY OF THE INVENTION

According to the present invention a process is provided for catalyzing chemical reactions, said process comprising the steps of:

bringing the reaction system into contact with a surface of a solid, electrically conducting layer provided with an underlying electrically insulating or semi-conducting layer; and passing a given electric current successively across both said layers;

the whole arrangement being such as to allow heterogeneous catalysis of the desired chemical reaction at said surface due to the passage of said current.

The invention also provides a device for catalysing chemical reactions, said device comprising: a stratified body having at least one electrically insulating or semi-conducting layer covered at least partially with an electrically conducting layer having an outer surface suitable for contact with the reaction system; and means for applying a given voltage across said body so as to cause passage of a given electric current across said two layers.

As is shown hereinafter, a substantial catalytic effect is obtained by the invention.

Due to current passage across the said insulating or semi-conducting layer, the electrons acquire excess energy with respect to the Fermi level. When the said outer conducting layer is positively polarized, high-energy electrons, or so-called hot electrons, pass through this layer and reach the outer surface thereof with excess energy which is available for transfer to chemisorbed complexes at this surface, whereby to activate them to higher vibration-rotation states.

The novel catalytic effect described hereinafter may thus be explained in terms of an interaction and energy transfer between hot electrons and chemisorbed complexes at the said outer surface, which will hereinafter be called the catalyzing surface. The high selectivity with which the said effect is obtained may be similarly explained by the fact that the level of the said activation of the chemisorbed complexes can be controlled by varying the voltage applied across the stratified body.

The following description will serve to more fully explain the invention with reference to the drawing.

SPECIFIC DESCRIPTION

Figure 1:
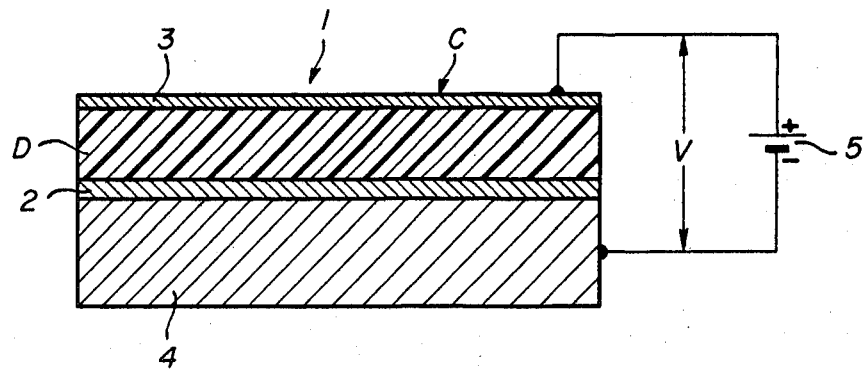
FIG. 1 is a schematic sectional view of an embodiment of a device serving to catalyse chemical reactions in accordance with the present invention.

In the embodiment shown schematically and by way of example in FIG. 1, the device serving to catalyze chemical reactions is in the form of a stratified plaquette 1 consisting essentially of a so-called M-D-M junction formed of a metallic layer 2 covered with a dielectric (insulating or semi-conduction) layer D which in turn is covered with a metallic layer 3 presenting an outer surface C with which the reaction system is to be brought into contact to produce the desired heterogenous catalysis. As may further be seen from FIG. 1, this M-D-M arrangement is formed on a metallic support 4.

The described plaquette 1 of FIG. 1 comprises, for example, a nickel support 4 with a thickness of 1 mm; an inner gold layer 2 with a thickness of 1 μm; an alumina layer D with a thickness of 50–1500 A; and an outer layer 3 with a thickness of 100 A.

As is further shown schematically in FIG. 1, the outer layer 3 and the support 4 of the stratified plaquette 1 are respectively connected to the terminals of an electrical source 5 adapted to apply a given, adjustable potential V which provides a given flow of electric current through the plaquette 1, whereby to produce a catalytic effect at the surface C, as is explained hereinafter.

Figure 2:
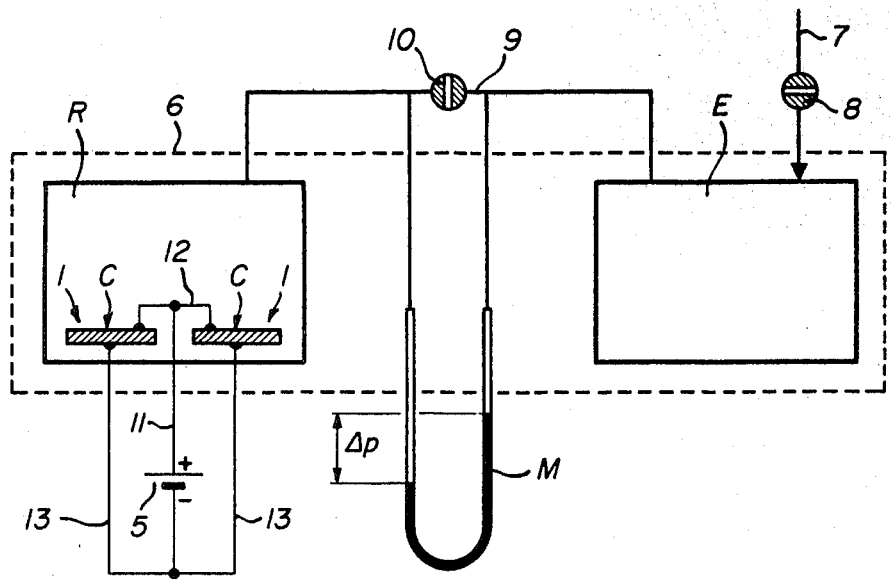
FIG. 2 is a schematic view of a test reactor used when carrying out the invention.

FIG. 2 shows schematically a test reactor used for carrying out a catalytic reaction in accordance with the invention. As may be seen from FIG. 2, the test reactor comprises:

- a reaction chamber R containing five stratified plaquettes 1 such as are described above with reference to FIG. 1, only two of these plaquettes being visible in FIG. 2;
- a compensating chamber E having the same volume (100 cm$^3$) and a similar geometry to the reaction chamber R;
- a thermostatically controlled block 6 (shown in dotted lines in FIG. 2), wherein both chambers E and R are maintained at the same temperature $\theta_R$;
- an inlet tube 7 connected to chamber E for introducing the starting materials for the reaction, said inlet being equipped with a stop-cock 8;
- a differential oil-manometer M (oily density 1.026) connected to the chambers R and E, with a by-pass line 9 equipped with a stop-cock 10 which provides, in its open position, a direct communication between these chambers; a closure of the stop-cocks 8 and 10 isolates the chambers R and E from the surrounding atmosphere and from each other, so that the differential manometer M then allows measurement of any pressure difference ($\Delta p$) which arises between these chambers when a chemical reaction takes place in the test reactor.

In order to allow satisfactory measurement of the catalytic effect in the described test reactor, a total catalyzing surface of 5 cm$^2$ was provided for by using five plaquettes each having a surface C of 1 cm$^2$ and having the stratified structure described above with reference to FIG. 1. As is indicated in FIG. 2, these five plaquettes are connected up in parallel to a common electrical source 5, each outer layer 3 of the plaquettes being connected to the positive terminal of this source via conductors 11 and 12 having "Leitsilber" contacts providing a point-contact with the surface C of each plaquette 1, while the negative terminal of the source is connected to the supports 4 of the plaquettes via conductors 13.

The experimental results hereinafter described clearly demonstrate that a particular, well defined catalytic effect is produced by passage of an electric current across the stratified plaquettes described above and indicate experimentally the existence of a mechanism of energy transfer between the current of electrons and the chemisorbed complexes at the surface C of the plaquettes 1.

In all the experiments, a potential difference of constant value was applied across the described plaquettes so as to provide current flow across the insulating layer D (of 50–1500 A thickness) of each plaquette, the total voltage V of the source being chosen in the range between 1 and 5 volts.

The decomposition of formic acid on gold, according to the formula HCOOH → H$_2$ + CO$_2$, was investigated as a test reaction since the number of moles present in the chamber R increases during this reaction, thus allowing the decomposition rate to be readily determined by measuring the pressure rise in the reaction chamber R.

Formic acid at 98–100% produced by Reagenzien Merck was utilized and this product was subjected before use for the experiments to a purification in two steps, the first consisting in a dehydration by means of CuSO$_4$ and the second in a vacuum distillation, the purified formic acid being finally stored in phials sealed under vacuum, at about 5° C.

In order to further exclude possible errors due to poisoning or ageing of the gold surfaces C, the rate of the catalytic reaction was measured according to the following sequence:

The pressure rise $\Delta p$ was first recorded as a function of time during five minutes, without connecting up the electric source, then during five minutes with the source connected so as to produce the current and, finally, during 5 minutes after having disconnected the source once more. The reaction speeds should in that case be the same before and after the passage of the electron current, if no irreversible modification of the state of the catalyzing surface has occurred, and so long as the concentration of the reaction products is sufficiently far from the equilibrium state.

In order to measure the reaction speed, the following procedure was chosen:

The apparatus brought under vacuum is first preheated by means of the block 6 to the desired reaction temperature $\theta_R$. Then 10 microliters (2.2 × 10$^{-4}$ mole) of formic acid are injected into the chamber E through the inlet 7, the inlet-cock 8 and the by-pass-cook 10 being opened. After waiting for 5 minutes to establish equilibrium of gas temperature and gas pressure in the chambers R and E, the initial pressure (about 20 Torr) in these chambers is controlled by means of a mercury manometer. To determine the rate of the reaction, the by-pass-cock 10 then closed and the pressure differences ($\Delta p$) measured by the differential manometer M are recorded as a function of time.

Several series of experiments were carried out, on one hand, with different current densities $j$ supplied by the electric source (with $j$ lying in the range 0.8 to 2 A/cm$^2$) and, on the other hand, with different reaction temperatures ($\theta_R$ = 20°, 180°, 200°, 250° C), which were maintained constant to within ± 1° C by means of the block 6.

Figure 3:
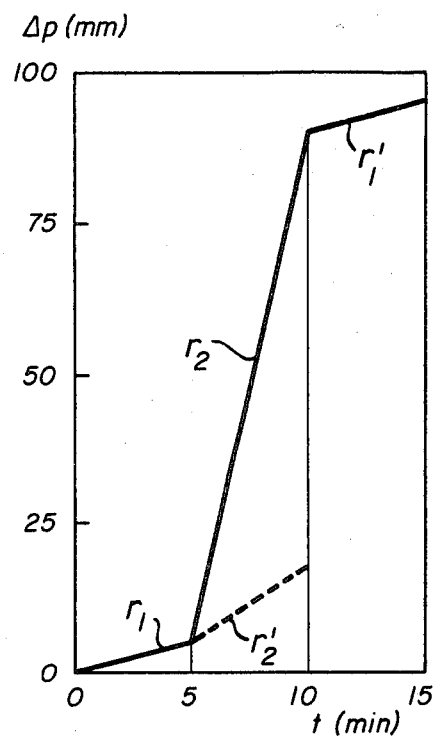
FIG. 3 shows an experimental curve illustrating the acceleration of the chemical reaction rate achieved when using the device of FIG. 1 in the reactor of FIG. 2 for carrying out the invention.

The results of these experiments may be summarized as follows:

FIG. 3 shows by way of example an experimental curve representing the variation of the pressure difference ($\Delta p$) as a function of time ($t$), during an experiment carried out at 250° C. This curve shows a marked acceleration in the decomposition rate during passage of current ($j = 1.25$ A/cm$^2$) as is shown by the abrupt change of slope ($r_1$ to $r_2$) of the curve on passing from the first portion ($t = 0$–5 min) to the second portion ($t = 5$–10 min). This acceleration may be expressed by the ratio of the slopes $r_2/r_1$.

Increases of the reaction rate reaching more than a hundred times were achieved in various similar test series wherein the conditions were varied in the ranges above, the same general type of change of slope being obtained in all cases when the current was switched on.

Further experiments were carried out under similar conditions wherein, however, the electrical connection was inversed, so that the negative terminal of the source 5 is connected to the outer layer 3, i.e. to the catalyzing surface C. The effect of this invention of the direction of the current flow through the plaquettes is given by the line with slope $r'_2$ also shown in FIG. 3, which clearly shows that a well determined catalytic effect is likewise obtained when the current flow across the plaquette is inversed, although this acceleration $r'_2/r_1$ of the reaction is considerably less than $r_2/r_1$.

It may thus be seen from FIG. 3 that the direction of current flow across the plaquettes 1 influences the extent of the catalytic effect resulting from said current flow, but that a qualitatively similar catalytic effect (acceleration) is obtained for both directions of current flow.

Figure 4:
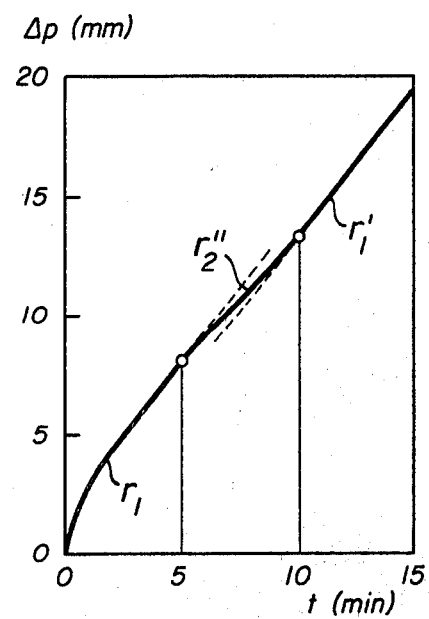
FIG. 4 shows an experimental curve illustrating the variation of the rate of the chemical reaction during passage of current across a conducting body only.

Similar experiments were also carried out using five plaquette samples without an insulating layer, i.e. each comprising soley a gold layer deposited on a nickel support with a surface of 1 cm$^2$. These samples were mounted in the reactor as already described and the same sequence of steps was carried out under the same conditions ($\Theta_R = 250°$ C, $j = 1.25$ A/cm$^2$). When the current source was connected to the gold layer and the nickel substrate, a slight but well defined deceleration ($r''_2/r_1$) of the decomposition reaction was observed, as appears in FIG. 4, and this effect disappeared as soon as the current was cut off. This deceleration is presumably due to a mechanism which is different to that obtained when the plaquettes of FIG. 1 having an intermediate insulating layer are used.

Figure 5:
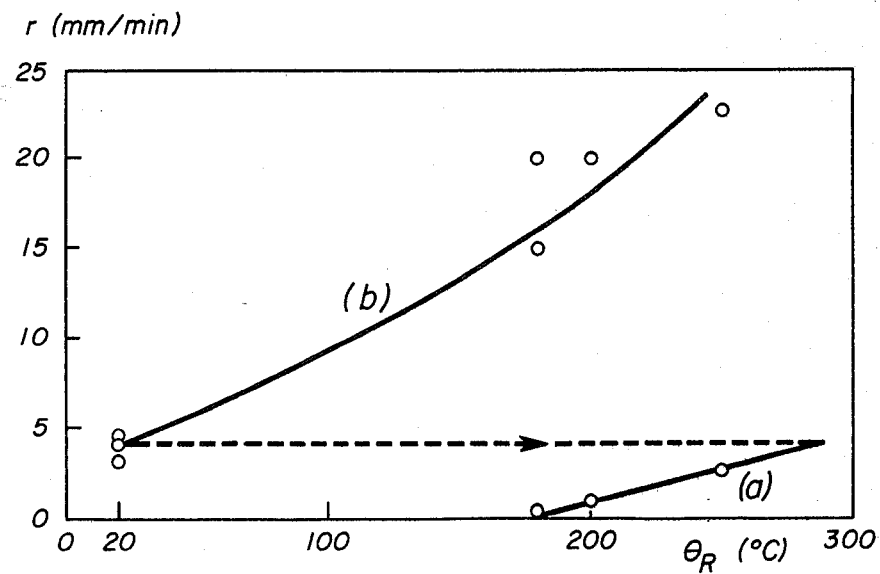
FIG. 5 shows the catalytic effect obtained at different temperatures by passage of current through the device of FIG. 1 in comparison to that obtained by thermal activation only.

FIG. 5 shows the results of experiments carried out at different temperatures of the test reactor. Curve (a) shows the influence of the temperature on the decomposition rate (expressed by $r$ in mm of oil/min.), in the absence of electric current flow. On the other hand, curve (b) shows the decomposition rate during current flow at $j = 1$ A/cm$^2$, as a function of temperature. As appears from the curve ($a$), the decomposition reaction has, below 170° C, such a low rate as to be unmeasurable. On the other hand, as also appears from FIG. 5, current flow produces such an acceleration of the reaction, that decomposition takes place already at 20° C and, as is indicated by the discontinuous horizontal line in FIG. 5, the reaction rate then corresponds to that which is obtained at a temperature of 290° C in the absence of current flow.

From the experimental results discussed above with reference to FIGS. 1 to 5, it may be readily seen that the passage of current through the stratified plaquettes, as is provided for by the invention, allows a very substantial acceleration of the chemical reaction to be achieved and that this result is not due to a local heating (Joule) effect. A hunderfold increase of the reaction rate was experimentally obtained for the decomposition of formic acid, but further improvement of the plaquette and selection of optimum operating conditions during the reaction can provide further substantial increase of the reaction rate.

The above-mentioned experimental results clearly show the high reaction rate increase which is achieved by the invention and a similar catalytic effect can obviously be obtained in other reactions of various types.

The invention moreover provides considerable advantages with regard to the problems of selectivity, as is demonstrated hereinafter.

These advantages apply, for example, to the case of the oxidation of propene to propylene oxide. As is well known, this oxidation reaction produces a great number of intermediate oxidation products and may moreover lead to a final stage of total oxidation of propene, i.e. to the production of $CO_2$ and/or of $CO$ and $H_2O$. The production of propylene oxide thus presents particular problems with regard to selectivity and no satisfactory industrial catalyst is presently available for this reaction.

The experimental results discussed below show the substantial improvement which is achieved with regard to these problems when the present invention is carried out to catalyze the oxidation of propene to propylene oxide.

Similar stratified plaquettes to those described above were used to investigate this reaction which was carried out under continuous gas flow conditions in a text reactor containing five plaquettes. The reactor was maintained at a constant temperature of 314° C and supplied continuously at a constant rate (50 cm$^3$/min) with the preheated reactants (26.5 vol% $O_2$), while the reaction products were periodically analyzed in a gas-chromatograph.

Figure 6:
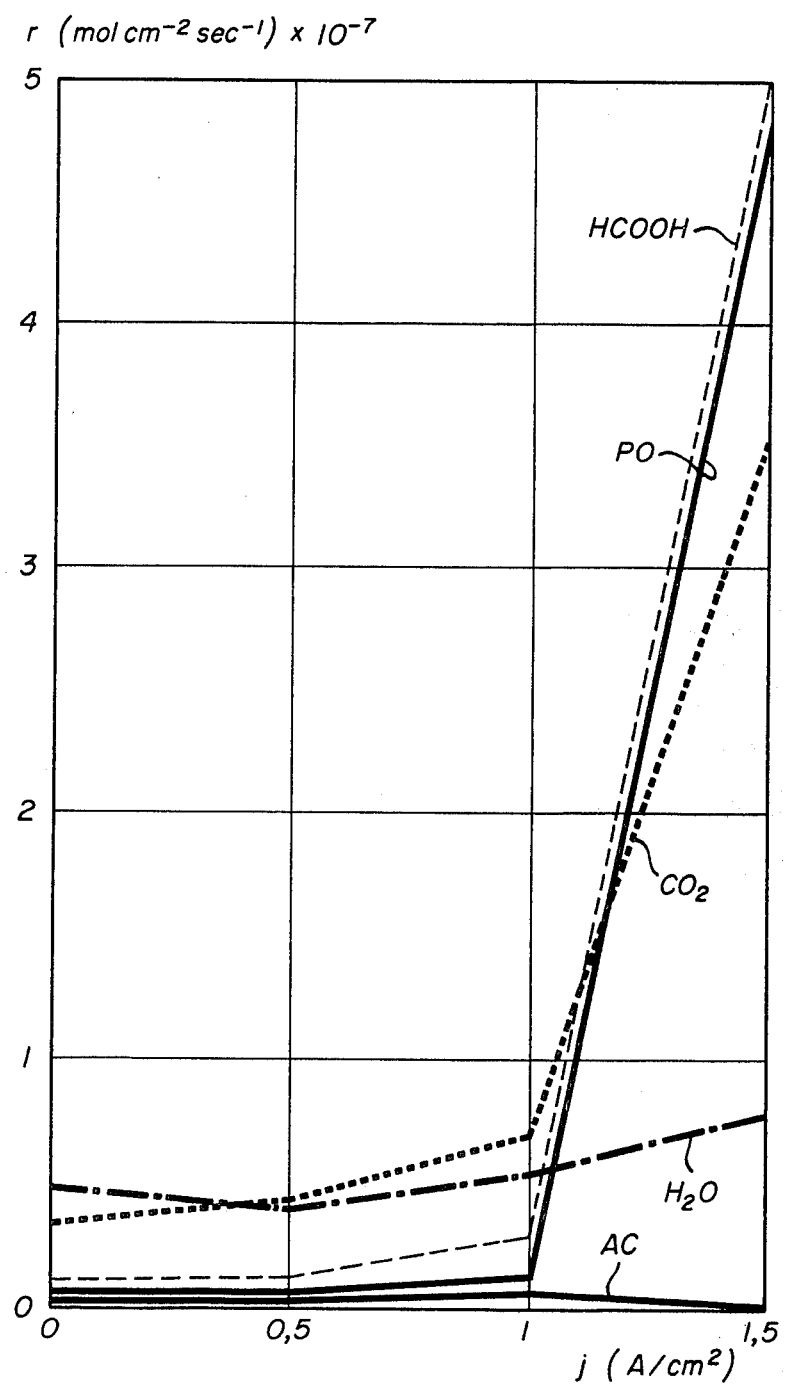
FIG. 6 shows an experimental curve illustrating the particular effect of the invention with regard to selectivity.

The curves of FIG. 6 show the variation of the respective production rates $r$ expressed in [mole.cm$^{-2}$.sec$^{-1}$] for the different reaction products, as a function of current density $j$ in the range between 0 and 1.5 A/cm$^2$.

As may be seen from FIG. 6, the production rate ($r_{PO}$) of propylene oxide undergoes a steep rise as $j$ increases from 1 to 1.5 A/cm$^2$, the production rate being 73.5 times greater at $j = 1.5$ A/cm$^2$ than at $j = 0$. On the other hand, FIG. 6 shows that the production rate ($r_{CO_2}$) of carbon dioxide simultaneously increases by only 10.4 times and that acrolein was not detected to all in the reaction products at $j = 1.5$ A/cm$^2$.

From these experimental results it may be concluded:

(a) an increase of the current density beyond 1 A/cm$^2$ provides a considerable acceleration of the overall reaction rate of propene oxidation;

(b) although a comparison of the respective equilibrium constants shows that the production of acrolein is thermodynamically favoured with respect to the production of propylene oxide, the acrolein production rate ($r_{AC}$) decreases when $j$ increases above 1.0 A/cm$^2$ and tends to zero at $j = 1.5$ A/cm$^2$;

(c) the production rate ($r_{PO}$) of propylene oxide is considerably accelerated by increasing $j$ from 1.0 to 1.5 A/cm$^2$.

The experimental results which are discussed above and illustrated in FIG. 6 clearly show the high selectivity which is achieved with respect to the production of propylene oxide when effecting the catalysis of propene oxidation in accordance with the invention.

As may be seen from the above explanations with reference to the experimental results shown in FIGS. 3 to 6, it has been experimentally demonstrated that the present invention allows a novel catalytic effect to be achieved with a notable improvement with regard to activity as well as selectively.

Indeed, a well defined catalytic action was obtained when carrying out the present invention to catalyze the two fundamentally different types of chemical reaction discussed above by way of example.

It may thus be seen that the present invention provides a novel catalytic effect which is by no means limited to any particular reaction or type of reaction. The previously described energy transfer producing this novel catalytic effect can be considered to be basically the same in different reactions which take place the gaseous or liquid phase and the optimum current flow conditions may be readily determined, for each chemical reaction to be catalyzed according to the invention, by varying the potential drop applied across the said stratified body.

The present invention may thus be advantageously applied to a broad range of chemical reactions of industrial interest which may, for example, serve to effect:

(a) isomerisation;
(b) synthesis (e.g. $NH_3$ synthesis, halogenations, oxidations, hydrogenations, etc);
(c) polymerisation;
(d) pollution control (e.g. decomposition of NO, CO oxidation, post-combustion of hydrocarbons, etc.).

Due to the fact that high reaction rates can be achieved at low temperature (e.g. see FIG. 5), the invention is of particular interest for all reactions where high temperatures should be avoided (e.g. biochemical reactions).

The voltage drop applied across the stratified body itself (i.e. excluding the voltage drop across the contacts) will generally lie in the range between 0.1 and 10 volts, whereas the current density per unit area of the outer surface (C) of the body may have any desired value (up to breakdown of the insulating or semi-conducting layer).

It may further be mentioned that the conducting layer having said outer surface (C), at which catalysis is carried out in accordance with the invention, need not necessarily be formed of a material which is normally used as a catalyst, since the above-mentioned novel catalytic effect is essentially due to energy transfer resulting from current flow across the stratified body, rather than to the catalytic properties of the material of this conducting layer itself. Thus, for example, various alloys or metals such as nickel, silver or gold may be used to form the conducting layer, although various other materials such as electrically conducting metal oxides may likewise be contemplated for this purpose.

It should also be noted that the electrical connection of the stratified body may be reversed with respect to the arrangement shown in FIG. 1, and that a notable catalytic effect is also achieved in that case, which might be explained, in a similar manner as above, namely in terms of so-called hot holes.

The passage of current across the stratified body may thus be effected in either direction or alternately in both directions. The use of an a.c. source may thus also be contemplated when carrying out the invention.

Substantially larger catalytic surfaces may be used for carrying out the invention on an industrial scale but, since the novel catalytic effect may be several orders of magnitude higher than with conventional catalysts, the catalyzing surface may obviously be considerably reduced. It is understood that the catalytic surface and hence the stratified body can have any suitable shape according to the intended application. Thus for example, instead of using a stratified body in the form of a plaquette, it may be in the form of a cylindrical body arranged coaxially with respect to a reaction tube.

The device of the invention can have any suitable stratified structure for producing the desired electron flow and it may be, for example, in the form of an Esaki diode.

I claim:

1. A process for selectively accelerating the neterogeneous reaction of fluid chemical reactants comprising reactant molecules to desired reaction products by electronic means comprising the steps of (a) providing an m-d-M layered electronic element comprising an inner electrically conductive support (M), a thin outer layer of an electrically conductive material (m) capable of chemisorbing the reactant molecules on an outer surface thereof, and an intermediate film (d) of insulating or semiconducting material separating said inner support and said outer layer, said intermediate film having a thickness of 50–1500 A and electrical properties such that if a voltage within a given range of voltages is applied across said layered electronic element from said inner support to said outer layer, a current is produced therebetween by moving electrons, at least a portion of which electrons pass through said intermediate film and arrive at said outer layer with energies in excess of the Fermi level for said outer layer conductive material;

(b) bringing said chemical reactants into contact with the outer surface of said outer electrically conductive layer of said layered electronic element such that the reactant molecules are chemisorbed as complexes thereon;

(c) applying a voltage within said given range of voltages across said layered electronic element from said inner support to said outer layer, thereby producing a current therebetween and electrons in the outer layer with energies in excess of the Fermi level and thereby increasing the rate of reaction of the chemical reactant complexes to chemical products at the outer surface as a function of said current; and (d) adjusting said voltage within said range of voltages to favor production of said desired reaction product.

2. The process of claim 1 wherein said range of voltages is between about 0.1 and 10 volts.

3. The process of claim 2 wherein the range of voltages produces a current density of between about 0.8 ampere/$cm^2$ and 2 ampere/$cm^2$.

4. The process of claim 1 for accelerating a reaction by electronic means wherein the outer conductive layer of said layered electronic element is made of a material which is catalytically active with respect to the chemical reaction of said reactants to chemical products.

5. The process of claim 4, wherein the catalytically active outer layer is selected from gold, silver or nickel.

6. The process of claim 1 wherein the chemical reactants are gaseous.

7. The process of claim 6 for selectively accelerating an oxidation reaction wherein the gaseous chemical reactants are a normally gaseous olefin and oxygen and the desired reaction product is an oxide of the olefin.

8. A process for selectively accelerating the heterogeneous oxidation of propene to desired oxidation products by electronic means comprising the steps of
   (a) providing a m-d-M layered electronic element comprising an inner electrically conductive support (M), a thin outer layer of an electrically conductive material (m) capable of chemisorbing propene and oxygen molecules on an outer surface thereof, and an intermediate film (d) of insulating or semiconducting material separating said inner support and said outer layer, said intermediate film having a thickness of 50–1500Å and electrical properties such that if a voltage within a given range of voltages is applied across said layered electronic element from said inner support to said outer layer, a current is produced therebetween by moving electrons, at least a portion of which electrons pass through said intermediate film and arrive at said outer layer with energies in excess of the Fermi level for said outer layer conductive material;
   (b) bringing propene and oxygen into contact with the outer surface of said outer electrically conductive layer of said layered electronic element such that the propene and oxygen molecules are chemisorbed as complexes thereon;
   (c) applying a voltage within said given range of voltages across said layered electronic element from said inner support to said outer layer, thereby producing a current therebetween and electrons in the outer layer with energies in excess of the Fermi level and thereby increasing the rate of oxidation of propene at the outer surface as a function of said current.

9. The process of claim 8 wherein
   (a) the outer layer conductive material is gold,
   (b) the intermediate film is alumina with a thickness of about 50–1500 Å, and
   (c) the range of voltages produces a current density of between about 0.8 ampere/cm$^2$ and 2 ampere/cm$^2$.

* * * * *